United States Patent
Lee et al.

(10) Patent No.: US 12,517,220 B2
(45) Date of Patent: Jan. 6, 2026

(54) SIGNAL SIMULATOR AND SIGNAL SIMULATION METHOD

(71) Applicant: HYUNDAI MOBIS CO., LTD., Seoul (KR)

(72) Inventors: Tae Yun Lee, Seongnam-si (KR); Do Yun Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 286 days.

(21) Appl. No.: 18/220,994

(22) Filed: Jul. 12, 2023

(65) Prior Publication Data
US 2024/0019542 A1    Jan. 18, 2024

(30) Foreign Application Priority Data
Jul. 14, 2022    (KR) .................. 10-2022-0086928

(51) Int. Cl.
*G01S 7/40* (2006.01)
(52) U.S. Cl.
CPC .................. *G01S 7/4095* (2021.05)
(58) Field of Classification Search
None
See application file for complete search history.

(56) References Cited

U.S. PATENT DOCUMENTS

| | | | | |
|---|---|---|---|---|
| 2,421,016 A * | 5/1947 | Labin | .......... | G01S 7/40 342/174 |
| 2,781,511 A * | 2/1957 | Pear, Jr. | .......... | G01S 7/40 342/172 |
| 3,308,461 A * | 3/1967 | Von Fange | .......... | G01S 7/4021 342/169 |
| 4,107,681 A * | 8/1978 | Robertson | .......... | G01S 13/345 342/135 |
| 4,121,213 A * | 10/1978 | Bush | .......... | G01S 7/4052 342/172 |
| 4,523,196 A * | 6/1985 | Gieraths | .......... | G01S 7/40 342/25 R |
| 5,164,734 A * | 11/1992 | Fredericks | .......... | G01S 13/913 342/187 |
| 5,300,934 A * | 4/1994 | Asbell | .......... | G01S 7/4052 342/172 |
| 5,448,501 A * | 9/1995 | Hablov | .......... | G01S 13/56 342/28 |
| 5,518,400 A * | 5/1996 | Otoide | .......... | G01S 7/4052 434/4 |
| 6,031,482 A * | 2/2000 | Lemaitre | .......... | G01S 7/415 342/28 |
| 10,852,394 B2 * | 12/2020 | Salvesen | .......... | G01S 7/4052 |

(Continued)

FOREIGN PATENT DOCUMENTS

| | | |
|---|---|---|
| KR | 10-2019-0101909 A | 9/2019 |
| KR | 10-2021-0023556 A | 3/2021 |
| KR | 10-2326781 B1 | 11/2021 |

*Primary Examiner* — Bernarr E Gregory
(74) *Attorney, Agent, or Firm* — Morgan Lewis & Bockius LLP (57) ABSTRACT

A signal simulator and a signal simulation method are provided. A radar signal (electromagnetic wave) is received. The received electromagnetic wave is converted and the converted electromagnetic wave is transmitted. The electromagnetic wave may be converted based on a respiratory cycle. A signal reflected by respiration of a living creature is simulated to easily verify the biosignal sensing performance of a radar device.

18 Claims, 5 Drawing Sheets

(56) References Cited

U.S. PATENT DOCUMENTS

| | | | |
|---|---|---|---|
| 11,994,614 B2* | 5/2024 | Paul .................. | G01S 13/931 |
| 2003/0164793 A1* | 9/2003 | Ludewig ............... | G01S 7/4052 |
| | | | 342/170 |
| 2006/0267832 A1* | 11/2006 | Newberg .............. | G01S 7/4052 |
| | | | 342/195 |
| 2016/0377705 A1* | 12/2016 | Zack ...................... | G01S 7/414 |
| | | | 342/21 |

* cited by examiner

(a) Inhalation
(Expansion of chest)

(b) Exhalation
(Contraction of chest)

FIG. 5

| Frame | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Range | 2.6 | 2.4 | 1.9 | 1.3 | 0.7 | 0.2 | 0 | 0 | 0 | 0.2 | 0.7 | 1.3 | 1.9 | 2.4 | 2.6 |

SIGNAL SIMULATOR AND SIGNAL SIMULATION METHOD

CROSS-REFERENCE TO RELATED APPLICATIONS

Pursuant to 35 U.S.C. § 119(a), this application claims the benefit of an earlier filing date and right of priority to Korean Application No. 10-2022-0086928, filed on Jul. 14, 2022, the contents of which are hereby incorporated by reference herein in their entirety.

TECHNICAL FIELD

The present embodiments relate to a signal simulator (or a simulation device) and a signal simulation method and, more particularly, to a signal simulator and a signal simulation method usable for the performance verification of a radar mounted on a vehicle.

BACKGROUND

A radar sensor used for a vehicle may be mounted inside or outside the vehicle to measure distance, speed, and angle with respect to a surrounding object (e.g., another vehicle or a structure). The measured data may be used to control the vehicle and may prevent vehicle accidents in the case of emergency or provide convenience information useful for driving by recognizing the driver.

Patent documents related to such a vehicular radar sensor include Korean Patent Registration No. 10-2326781 (Nov. 10, 2021), Korean Patent Publication No. 10-2021-0023556 (Mar. 4, 2021), and Korean Patent Publication No. 10-2019-0101909 (Sep. 2, 2019).

Recently, research on vehicular radar sensors is being conducted to easily sense a living creature (a human being or animal) that is relatively small in size and slow in speed. To commercialize this radar sensor, a procedure for verifying sensor performance during mass production is necessary. Therefore, there is a need for a device and method capable of simulating biosignals of a person or an animal in order to verify the performance of the sensor.

SUMMARY

An object of an embodiment of the present disclosure is to provide a signal simulator that converts a radar signal into a reflection signal similar to that in a real environment and radiates the converted reflection signal.

Another object of an embodiment of the present disclosure is to provide a signal simulator that generates a reflection signal for a radar signal by simulating a biosignal.

Another object of an embodiment of the present disclosure is to provide a signal simulator that generates a reflection signal for a radar signal based on biological characteristics of a living creature.

The objects to be achieved by the present disclosure are not limited to what has been particularly described hereinabove and other objects not described herein will be more clearly understood by persons skilled in the art from the following detailed description.

To achieve these objects and other advantages and in accordance with the purpose of the disclosure, as embodied and broadly described herein, a signal simulator includes a receiver configured to receive a signal transmitted by a radar sensor, a converter configured to delay the signal received from the receiver, and a transmitter configured to transmit the signal delayed by the converter to the radar sensor. The converter delays the received signal based on a respiratory cycle.

The converter may include a plurality of delays configured to delay the received signal.

The converter may include a plurality of switches connected to the plurality of delays.

The respiratory cycle may be 3 to 5 seconds, and the converter may control on and off states of the plural switches according to the respiratory cycle.

The plurality of delays may delay the received signal to different degrees of delay.

In another aspect of the present disclosure, a signal simulator is configured to cyclically delay a signal received from a vehicular radar sensor according to a respiratory cycle and radiate the delayed signal.

In another aspect of the present disclosure, a signal simulator is configured to simulate delay of a signal received from a vehicular radar sensor according to respiration of a living creature, delay the simulated signal, and radiate the delayed signal to the vehicular radar sensor.

In another aspect of the present disclosure, a signal simulation method of the signal simulator includes receiving a signal from the radar sensor, converting the signal, and transmitting the converted signal to the radar sensor. The converting the signal includes delaying the signal based on a respiratory cycle.

The converting the signal may include delaying the signal by causing any one delay among the plurality of delays to be selectively turned on.

The plurality of delays may delay the received signal to different degrees of delay.

The converting the signal may include increasing or decreasing a degree of delay of the signal according to the respiratory cycle, and the respiratory cycle may be equal to a cycle at which the degree of delay of the signal is increased or decreased.

In another aspect of the present disclosure, a signal simulation method includes setting a respiratory cycle of a living creature, setting a movement range of a chest or an abdomen of the living creature according to a specific time interval within the respiratory cycle, calculating a degree of delay of a signal based on the movement distance of the chest or the abdomen, and delaying a signal received from a radar sensor according to the calculation.

According to an embodiment of the present disclosure, a biosignal similar to that in a real environment may be simulated.

According to an embodiment of the present disclosure, the biosignal sensing performance of a vehicular radar sensor may be easily verified by simulating a biosignal similar to that in a real environment.

The effects that are achievable by the present disclosure are not limited to what has been particularly described hereinabove and other advantages not described herein will be more clearly understood by persons skilled in the art from the following description.

DETAILED DESCRIPTION

Advantages and features of the present disclosure and methods to achieve the same will be apparent from the following detailed description of embodiments taken in conjunction with the accompanying drawings. The present disclosure may, however, be implemented in various different ways and should not be construed as being limited to the embodiments disclosed hereinbelow. Rather, the present embodiments are provided so that this disclosure will be through and complete, and will fully convey the concepts of the present disclosure to those of ordinary skill in the art, and the present disclosure is only defined by the accompanying claims and equivalents thereto.

Terms used in the present specification are used in order to describe embodiments, but are not intended to limit the scope of the present disclosure. As used in the present specification, a singular form may also include a plural form, unless otherwise defined contextually. Moreover, terms "comprise", "include", or "have" used in this specification specify the presence of stated elements but do not preclude the presence or addition of one or more other elements. Like numbers refer to like elements throughout the specification. As used herein, term "and/or" includes each and all combinations of one or more of elements mentioned. Terms such as "first" or "second" are used in order to describe a variety of elements, but it is apparent that such elements should not be limited to the scope of these terms. The terms are used solely for the purpose of distinguishing one element from another. Accordingly, it is apparent that a first element mentioned hereinbelow could be termed a second element, without departing from the scope of the present disclosure.

Unless otherwise defined, all terms (including technical and scientific terms) used herein have the same meaning as commonly understood by one of ordinary skill in the art to which the present disclosure belongs. Terms, such as those defined in commonly used dictionaries, are not to be interpreted in an idealized or overly formal sense unless expressly so defined herein.

Figure 1:
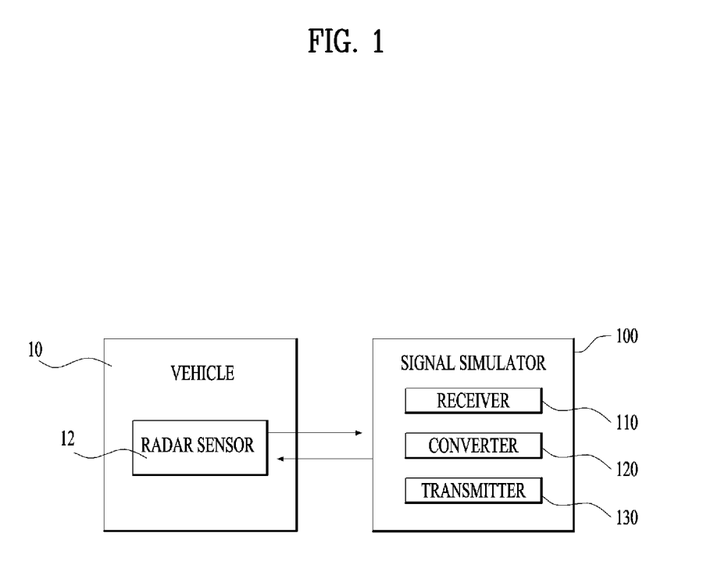
FIG. 1 illustrates a signal simulator and a radar sensor of a vehicle according to an embodiment of the present disclosure.

FIG. 1 illustrates a signal simulator 100 (hereinafter referred to as a "simulator") and a radar sensor 12 of a vehicle 10 according to an embodiment of the present disclosure. In the simulator 100 and a signal simulation method, a signal (e.g., an electromagnetic wave) transmitted by the radar sensor 12 of the vehicle 10 may be received, the received signal may be delayed, and the delayed signal may be sent back to simulate the sent signal for a specific object (e.g., a living creature such as a person or an animal).

Referring to FIG. 1, the simulator 100 includes a receiver 110, a converter 120, and a transmitter 130.

The receiver 110 may receive a signal (e.g., an electromagnetic wave) transmitted by the radar sensor 12 of the vehicle 10. The converter 120 converts the signal received from the receiver 110. The transmitter 130 may transmit the signal converted by the converter 120.

The converter 120 may delay the received signal based on a respiratory cycle. Accordingly, the converter 120 may simulate a reflection wave reflected by a living creature. The converter 120 may delay the received signal in a manner of simulating a delay effect of a signal generated according to the respiratory cycle with respect to the received signal.

The respiratory cycle may be 3 to 5 seconds. A cycle at which the converter 120 delays the signal (e.g., electromagnetic wave) is the same as the respiratory cycle. The converter 120 may increase or decrease the degree of delay of the received signal within a set respiratory cycle. For example, when the set respiratory cycle is 3 seconds, the converter 120 may increase and then decrease the degree of delay of the received signal at a cycle of 3 seconds.

Figure 2:
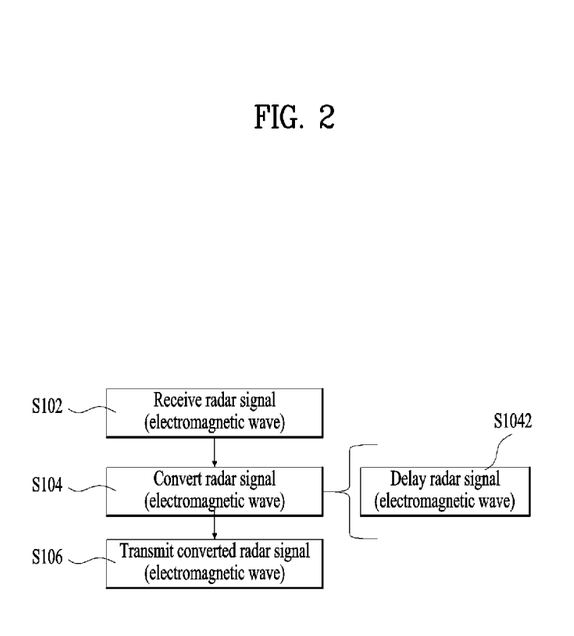
FIG. 2 is a flowchart illustrating a method of simulating and then transmitting a biosignal by a signal simulator according to an embodiment of the present disclosure.

FIG. 2 is a flowchart illustrating a method of simulating and then sending back a biosignal by the simulator 100. In the simulator 100 or the signal simulation method of the simulator 100, a radar signal may be delayed in order to simulate a signal obtained when the radar signal (e.g., an electromagnetic wave) is reflected by a living creature.

Referring to FIG. 2, the simulator 100 may receive a radar signal (electromagnetic wave) (S102), convert the radar signal (electromagnetic wave) (S104), and transmit the converted radar signal (S106). The radar signal may be converted by delay of the signal based on a respiratory cycle (S1042).

In FIG. 2, S102 may be performed by the receiver 110 of the simulator 100, S104 may be performed by the converter 120 of the simulator 100, and S106 may be performed by the transmitter 130 of the simulator 100.

Upon verifying the biosignal sensing performance of the radar sensor 12, step S102 is performed to receive an electromagnetic wave from the radar sensor 12 of the vehicle 10 and step S106 is performed to transmit the converted radar signal to the radar sensor 12 of the vehicle 10.

When the signal (electromagnetic wave) transmitted by the radar sensor 12 reaches a living creature, an arrival distance of the signal minutely changes while the chest or abdomen of the living creature expands or contracts due to respiration of the living creature. That is, when the living creature inhales, the chest or abdomen of the living creature expands and thus the arrival distance of the signal is minutely shortened. In contrast, when the living creature exhales, the chest or abdomen of the living creature contracts and thus the arrival distance of the signal is minutely increased. When a person respires, the chest (or abdomen or back) of the person expands or contracts according to a respiratory cycle, and the arrival distance of the signal transmitted by the radar sensor 12 changes according to such expansion and contraction.

The simulator 100 may simulate an effect in which the arrival distance of a signal changes according to the respiratory cycle of the living creature, delay the signal, and transmit the delayed signal to the radar sensor 12. Therefore, the simulator 100 may configure an environment for verifying performance (sensing of a biosignal) of the radar sensor 12 without relying on people or animals.

Figure 3:
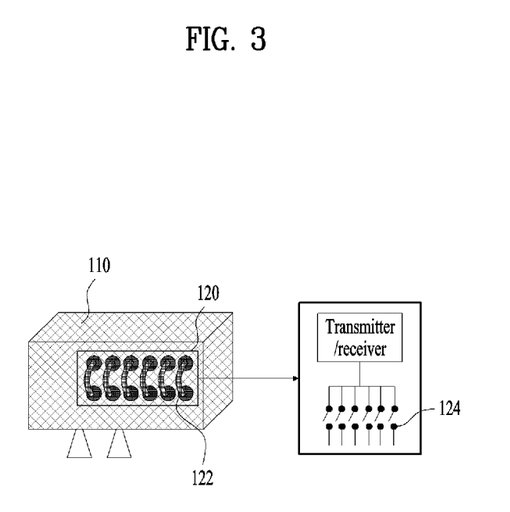
FIG. 3 illustrates a signal simulator according to an embodiment of the present disclosure.

FIG. 3 illustrates a signal simulator 100 according to an embodiment of the present disclosure.

Referring to FIG. 3, the signal simulator 100 may include a converter 120. The signal simulator 100 illustrated in FIG. 3 may correspond to the signal simulator 100 of FIG. 1, and the converter 120 illustrated in FIG. 3 may correspond to the converter 120 of FIG. 1.

The converter 120 includes a plurality of delays 122 for delaying the signal received from the receiver 110. The delays 122 may include delay lines that delay a signal. The degree of delay of the signal delayed by each of the delays 122 is different. Accordingly, the converter 120 may delay the signal with a set value by selectively applying any one of the delays 122.

The converter 120 may further include a plurality of switches 124 connected to the plurality of delays 122. One delay 122 is connected to one switch 124 corresponding thereto. Accordingly, the converter 120 may select application or non-application of the corresponding delay 122 by controlling the specific switch 124 to be turned on or off. The converter 120 may cause the delay 122 to delay a received signal by controlling the multiple switches 124 to be turned on or off.

The converter 120 may control the ON and OFF states of the multiple switches 124 according to the respiratory cycle of a living creature. For example, when there are switches numbered 1 to 6, the converter 120 may control only corresponding switches to be turned on in a specific order from number 1 to number 6. For example, the converter 120 may control only corresponding switches to be turned on in the order of 1→2→3→4→5→6→5→4→3→2→1 according to the respiratory cycle. Therefore, the delay 122 corresponding to each switch 124 is applied to a signal according to the respiratory cycle, and the signal may be delayed according to the delay range of each delay 122. A time interval for changing the on/off states of the switches 124 in the converter 120 may be appropriately selected in consideration of the respiratory cycle. The converter 120 may increase or decrease the degree of delay of the signal according to the respiratory cycle. The respiratory cycle and a cycle at which the delay of the signal is increased or decreased may be the same.

The converter 120 may delay a signal using at least one delay 122. For example, the converter 120 may control switches 1 and 2 to be turned on such that the delays 122 corresponding to switches 1 and 2 may be applied. In this case, since the effect of the multiple delays 122 may be accumulatively delayed.

Figure 4:
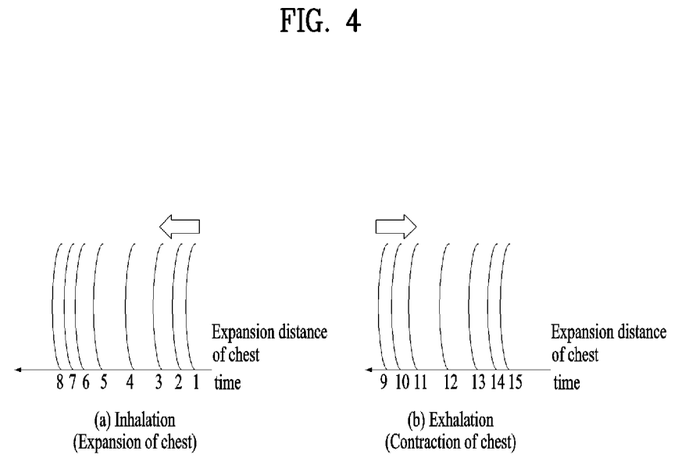
FIG. 4 is an exemplary diagram illustrating expansion or contraction of a chest according to a respiratory process of a living creature.

FIG. 4 is an exemplary diagram illustrating expansion or contraction of a chest according to a respiratory process of a living creature.

(a) of FIG. 4 illustrates that the chest (or body such as the abdomen or back) expands while a person inhales. Referring to (a) of FIG. 4, at the beginning of inhalation (for example, when Time is 1, 2, or 3) and at the end of inhalation (for example, when Time is 6, 7, or 8), the expansion rate of the chest is relatively slow, and in the middle of inhalation (for example, when Time is 4 or 5), the expansion rate of the chest is fast (this may be appreciated through a change in an expansion distance per time interval).

When a signal transmitted by the radar sensor 12 reaches a living creature, as the chest (or body such as the abdomen or back) expands in the case of inhalation, the distance between the radar sensor 12 and the chest decreases and thus the arrival distance of the signal decreases.

(b) of FIG. 4 illustrates that the chest contracts while a person exhales. Referring to (b) of FIG. 4, at the beginning of exhalation (for example, when Time is 9 or 10) and at the end of exhalation (for example, when Time is 13, 14, or 15), the contraction rate of the chest is relatively slow, and in the middle of exhalation (for example, when Time is 11 or 12), the contraction rate of the chest is fast (this may be appreciated through a change in a distance per time interval).

When the signal transmitted by the radar sensor 12 reaches a living creature, as the chest (or body such as the abdomen or back) contracts in the case of exhalation, the distance between the radar sensor 12 and the chest increases and thus the arrival distance of the signal increases.

That is, the signal arrival distance between the radar sensor 12 and the living creature cyclically changes by respiration. The radar sensor 12 may sense whether an object onto which a signal is reflected is the living creature by interpreting a reflection signal in which the arrival distance cyclically changes. That is, the radar sensor 12 may sense whether the reflection signal is a biosignal.

The simulator 100 may convert a received radar signal (or electromagnetic wave) by interpreting the radar signal as a reflection signal in which the arrival distance cyclically changes by respiration. That is, the converter 120 of the simulator 100 may simulate the reflection signal generated by the living creature by increasing or decreasing the degree of delay of the radar signal (electromagnetic wave) according to the respiratory cycle of the living creature.

In this case, the respiratory cycle of the living creature may be set to 3 to 5 seconds. The respiratory cycle of the living creature may be calculated by the number of respirations per minute (12 to 20 respirations). One respiratory cycle includes one inhalation and one exhalation. In addition, the distance that the chest (or abdomen or back) moves due to respiration of the living creature may be assumed to be within 5 cm.

Figure 5:
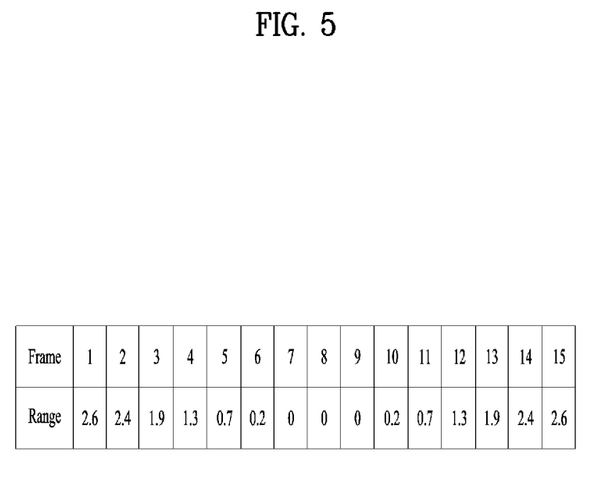
FIG. 5 is an exemplary diagram illustrating the degree of delay of a signal in each frame in a signal simulator according to an embodiment of the present disclosure.

FIG. 5 is an exemplary diagram illustrating the degree of delay of a signal in each frame in the simulator 100. A frame is a unit divided into regular time intervals. For example, a respiratory cycle of 3 seconds may be divided into 15 frames each having an interval of 200 milliseconds (ms).

Frames of FIG. 5 may correspond to the time values of FIG. 4. Referring to FIG. 5, frames 1 to 8 represent an inhalation process. As the chest of a person expands, a signal arrival distance between the radar sensor 12 and the chest decreases. Therefore, the degree of delay of a signal (range value) decreases from frame 1 to frame 8. The converter 120 according to embodiments may control the switch 124 at each frame interval to simulate a characteristic in which the signal arrival distance decreases according to respiration. The delay of the signal performed by the converter 120 may be the largest in frame 1 and the smallest in frame 8. In the case of frame 8, since there is no signal delay, frame 8 indicates that the converter 120 does not delay the signal.

In FIG. 5, frames 9 to 15 represent an exhalation process. Accordingly, as the chest of a person contracts, the signal arrival distance between the radar sensor 12 and the chest increases. Therefore, the degree of delay of a signal (range value) increases from frame 9 to frame 15. The converter 120 according to embodiments may control the switch 124 at each frame interval to simulate a characteristic in which the signal arrival distance increases according to respiration. The delay of the signal performed by the converter 120 may be the smallest in frame 9 and the largest in frame 15.

The simulator 100 may simulate a biosignal of a specific living creature to be simulated by delaying a signal based on the movement distance of the chest (or abdomen or back) of the living creature according to a respiratory cycle and respiration of the living creature. An increase or decrease in the degree of delay of the signal may be set based on data regarding respiration of the living creature.

The simulator 100 may control any one switch 124 among the multiple switches 124 to be turned on at a specific time interval (or a frame interval) to delay a signal through the delay 122 corresponding to the switch of the ON state. Accordingly, the simulator 100 may simulate and then transmit a signal reflected by the living creature.

For example, in a signal simulation method, a respiratory cycle of a specific living creature is set and the set respiratory cycle is divided according to a specific time interval to set a movement range of the chest of the living creature at each time. Accordingly, the movement distance (displacement) of the chest corresponding to a predetermined time interval within the set respiratory cycle is set. Then, the degree of delay of a signal is calculated based on the set movement distance of the chest. The signal may refer to an electromagnetic wave transmitted by the radar sensor. Then, the signal received from the radar sensor is delayed by the calculated degree of delay. For example, when the arrival distance of the signal in a certain frame increases by 2 cm relative to a minimum arrival distance, the converter according to an embodiment may delay the signal by a distance corresponding to 2 cm.

The delayed signal may be transmitted to the radar sensor. The above signal simulation method may be performed by the simulator 100 according to an embodiment.

The simulator 100 according to an embodiment simulates the signal received from the radar sensor 12 to be similar to a biosignal. Therefore, when verifying the biosignal sensing performance of the radar sensor 12, an actual living creature or dummy is not required and thus a performance verification process is facilitated. In case of mass production of the radar sensor 12, an effect in verifying the performance of the mass-produced product is greatly enhanced.

In addition, the simulator 100 according to an embodiment may simulate a biosignal in various environments. A wide range of biosignals may be simulated by reflecting change in distance from a sensor according to respiration. Therefore, according to the simulator 100, the sensing performance of various biosignals by the radar sensor 12 may be easily verified.

The description of various embodiments of the present disclosure is not limited to the corresponding embodiments, and it is understood that the technical idea of each embodiment applied in various embodiments may be applied even to other embodiments.

As described above, the detailed description of the embodiments of the present disclosure has been given to enable those skilled in the art to implement and practice the disclosure. Although the disclosure has been described with reference to the embodiments, those skilled in the art will appreciate that various modifications and variations may be made in the present disclosure without departing from the spirit or scope of the disclosure and the appended claims. For example, those skilled in the art may use constructions disclosed in the above-described embodiments in combination with each other.

Accordingly, the present disclosure should not be limited to the specific embodiments described herein, but should be accorded the broadest scope consistent with the principles and features disclosed herein.

What is claimed is:

1. A signal simulator, comprising:
   a receiver configured to receive a signal transmitted by a radar sensor;
   a converter configured to delay the signal received from the receiver; and
   a transmitter configured to transmit the signal delayed by the converter to the radar sensor,
   wherein the converter delays the received signal according to a respiratory cycle of an object so that the converter simulates a reflection wave reflected by the object.

2. The signal simulator of claim 1, wherein the converter includes a plurality of delay lines configured to delay the received signal.

3. The signal simulator of claim 2, wherein the converter includes a plurality of switches connected to the plurality of delay lines.

4. The signal simulator of claim 3, wherein the converter controls on and off states of the plurality of switches according to the respiratory cycle.

5. The signal simulator of claim 4, wherein the plurality of delay lines delay the received signal to different degrees of delay.

6. The signal simulator of claim 3, wherein the respiratory cycle is 3 to 4 seconds.

7. The signal simulator of claim 6, wherein the converter controls on and off states of the plural switches according to the respiratory cycle.

8. The signal simulator of claim 7, wherein the plurality of delay lines delay the received signal to different degrees of delay.

9. The signal simulator of claim 2, wherein the respiratory cycle is 3 to 4 seconds.

10. The signal simulator of claim 1, wherein the signal simulator configured to cyclically delay a signal received from the radar sensor according to the respiratory cycle and radiate the delayed signal.

11. The signal simulator of claim 1, wherein the signal simulator configured to simulate delay of a signal received from the radar sensor according to respiration of the object which is a living creature, delay the simulated signal, and radiate the delayed signal to the radar sensor.

12. A signal simulation method of a signal simulator comprising a receiver configured to receive a signal transmitted by a radar sensor; a converter configured to delay the signal received from the receiver; and a transmitter configured to transmit the signal delayed by the converter to the radar sensor, wherein the converter includes a plurality of delay lines configured to delay the received signal and a plurality of switches connected to the plurality of delay lines, the signal simulation method comprising:
   receiving the signal from the radar sensor;
   converting the signal; and
   transmitting the converted signal to the radar sensor,
   wherein the converting the signal includes delaying the signal according to a respiratory cycle of an object to simulate a reflection wave reflected by the object.

13. The signal simulation method of claim 12, wherein the converting the signal includes delaying the signal by causing any one delay among the plurality of delay lines to be selectively turned on.

14. The signal simulation method of claim 13, wherein the plurality of delay lines delay the received signal to different degrees of delay.

15. The signal simulation method of claim 14, wherein the converting the signal includes increasing or decreasing a degree of delay of the signal according to the respiratory cycle.

16. The signal simulation method of claim 15, wherein the respiratory cycle is 3 to 5 seconds.

17. The signal simulation method of claim 16, wherein the respiratory cycle is equal to a cycle at which the degree of delay of the signal is increased or decreased.

18. A signal simulation method, comprising:
   setting a respiratory cycle of a living creature;
   setting a movement range of a chest or an abdomen of the living creature according to a predetermined time interval within the respiratory cycle;
   calculating a degree of delay of a signal according to a movement distance of the chest or the abdomen; and delaying a signal received from a radar sensor according to the calculation to simulate a reflection wave reflected by the living creature.

\* \* \* \* \*